United States Patent
Lee et al.

(10) Patent No.: US 12,267,631 B2
(45) Date of Patent: Apr. 1, 2025

(54) NETWORK-ON-CHIP FOR PROCESSING DATA, SENSOR DEVICE INCLUDING PROCESSOR BASED ON NETWORK-ON-CHIP AND DATA PROCESSING METHOD OF SENSOR DEVICE

(71) Applicant: Electronics and Telecommunications Research Institute, Daejeon (KR)

(72) Inventors: Sukho Lee, Daejeon (KR); Sang Pil Kim, Sejong-si (KR); Young Hwan Bae, Daejeon (KR); Jae-Jin Lee, Daejeon (KR); Kyuseung Han, Daejeon (KR); Tae Wook Kang, Daejeon (KR); Sung Eun Kim, Daejeon (KR); Hyuk Kim, Daejeon (KR); Kyung Hwan Park, Daejeon (KR); Hyung-Il Park, Daejeon (KR); Kyung Jin Byun, Daejeon (KR); Kwang Il Oh, Daejeon (KR); In Gi Lim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 209 days.

(21) Appl. No.: 17/399,603

(22) Filed: Aug. 11, 2021

(65) Prior Publication Data
US 2022/0109808 A1    Apr. 7, 2022

(30) Foreign Application Priority Data
Oct. 7, 2020    (KR) .................. 10-2020-0129382

(51) Int. Cl.
*H04N 7/52*      (2011.01)
*H04N 7/01*      (2006.01)
(Continued)

(52) U.S. Cl.
CPC .............. *H04N 7/52* (2013.01); *H04N 7/0105* (2013.01); *H04N 7/08* (2013.01); *H04N 21/236* (2013.01);
(Continued)

(58) Field of Classification Search
CPC ...... H04N 7/0115; H04N 7/0147; H04N 7/08; H04N 7/084; H04N 7/081; H04N 7/083;
(Continued)

(56) References Cited

U.S. PATENT DOCUMENTS 5,731,847 A * 3/1998 Tsukagoshi .......... H04N 7/0885
                                                             348/E5.111
7,313,810 B1 * 12/2007 Bell .................... H04N 21/8146
                                                             348/E7.063
(Continued)

FOREIGN PATENT DOCUMENTS

JP    2017-98696     6/2017
JP    2017-526252    9/2017
(Continued)

*Primary Examiner* — David N Werner
(74) *Attorney, Agent, or Firm* — KILE PARK REED & HOUTTEMAN PLLC

(57) ABSTRACT

Disclosed is a network-on-chip including a first data converter that receives first image data and second image data from at least one image sensor and encodes one image data among the first image data and the second image data, into first data, based on whether the first image data is identical to the second image data and a second data converter that receives non-image data from at least one non-image sensor and encodes the received non-image data into second data. The network-on-chip outputs the first data and the second (Continued)

data to transmit the first data and the second data to an external server at a burst length.

12 Claims, 7 Drawing Sheets

(51) Int. Cl.
*H04N 7/08* (2006.01)
*H04N 7/088* (2006.01)
*H04N 21/236* (2011.01)
*H04N 21/488* (2011.01)
*H04N 5/278* (2006.01)

(52) U.S. Cl.
CPC ..... *H04N 21/23614* (2013.01); *H04N 21/488* (2013.01); *H04N 21/4882* (2013.01); *H04N 21/4884* (2013.01); *H04N 21/4886* (2013.01); *H04N 21/4888* (2013.01); *H04N 5/278* (2013.01); *H04N 7/0885* (2013.01)

(58) Field of Classification Search
CPC .... H04N 7/088; H04N 7/0881; H04N 7/0882; H04N 7/52; H04N 21/236; H04N 21/23614; H04N 21/488; H04N 21/4882; H04N 21/4884; H04N 21/4886; H04N 21/4888

See application file for complete search history.

(56) References Cited

U.S. PATENT DOCUMENTS

| | | | |
|---|---|---|---|
| 8,418,203 B1* | 4/2013 | Nishio | H04N 21/4351 725/32 |
| 9,681,111 B1* | 6/2017 | Newman | G11B 27/034 |
| 9,769,356 B2 | 9/2017 | Shacham et al. | |
| 10,084,710 B2 | 9/2018 | Yao et al. | |
| 10,136,441 B2 | 11/2018 | Backholm et al. | |
| 10,200,699 B2 | 2/2019 | Yamori | |
| 10,531,110 B2 | 1/2020 | Kalevo | |
| 10,633,296 B2 | 4/2020 | Baek | |
| 10,685,422 B2 | 6/2020 | Meixner et al. | |
| 10,694,349 B2 | 6/2020 | Na et al. | |
| 2002/0152647 A1* | 10/2002 | Hanafusa | E01H 5/04 37/251 |
| 2009/0149128 A1* | 6/2009 | Tomoda | H04N 21/47 455/41.3 |
| 2009/0161017 A1* | 6/2009 | Glen | H04N 21/436 348/E5.078 |
| 2011/0221863 A1* | 9/2011 | Eyer | H04N 19/597 348/E13.064 |
| 2012/0236113 A1* | 9/2012 | Eyer | H04N 21/816 348/43 |
| 2013/0176986 A1 | 7/2013 | Yu et al. | |
| 2014/0053174 A1* | 2/2014 | Eyer | H04N 21/4345 725/13 |
| 2015/0187390 A1* | 7/2015 | Pacurariu | G11B 27/322 386/227 |
| 2016/0026874 A1* | 1/2016 | Hodulik | H04N 21/2353 386/281 |
| 2016/0029105 A1* | 1/2016 | Newman | H04N 21/2353 386/281 |
| 2019/0286606 A1 | 9/2019 | Han et al. | |
| 2023/0283615 A1* | 9/2023 | Mori | G06F 21/60 726/4 |

FOREIGN PATENT DOCUMENTS

| | | |
|---|---|---|
| KR | 10-1227769 | 1/2013 |
| KR | 10-2016-0013799 | 2/2016 |
| KR | 10-2019-0065929 | 6/2019 |
| KR | 10-2016097 | 8/2019 |
| KR | 10-2019-0108001 | 9/2019 |
| KR | 10-2050899 | 12/2019 |
| KR | 10-2020-0074067 | 6/2020 |

* cited by examiner

NETWORK-ON-CHIP FOR PROCESSING DATA, SENSOR DEVICE INCLUDING PROCESSOR BASED ON NETWORK-ON-CHIP AND DATA PROCESSING METHOD OF SENSOR DEVICE

CROSS-REFERENCE TO RELATED APPLICATIONS

This application claims priority under 35 U.S.C. § 119 to Korean Patent Application No. 10-2020-0129382 filed on Oct. 7, 2020, in the Korean Intellectual Property Office, the disclosures of which are incorporated by reference herein in their entireties.

BACKGROUND

Embodiments of the present disclosure described herein relate to a network-on-chip for processing data, a sensor device including a processor based on the network-on-chip and a data processing method of the sensor device, and more particularly, relate to a network-on-chip for processing image data and non-image data, a sensor device including a processor based on the network-on-chip and a data processing method thereof.

A conventional network-on-chip technology exchanges data at high speed by solving a data bottleneck between a plurality of devices. However, the conventional network-on-chip technology may have large power consumption. Accordingly, it is difficult to implement a network-on-chip technology in an edge device in which power consumption is important.

SUMMARY

Embodiments of the present disclosure provide a network-on-chip capable of encoding data entered from various sensors and capable of being driven even at low power, an edge device based on the network-on-chip, and a data processing method thereof.

According to an embodiment of the present disclosure, a network-on-chip includes a first data converter that receives first image data and second image data from at least one image sensor and encodes one image data among the first image data and the second image data, into first data, based on whether the first image data is identical to the second image data, and a second data converter that receives non-image data from at least one non-image sensor and encodes the received non-image data into second data. The network-on-chip outputs the first data and the second data to transmit the first data and the second data to an external server at a burst length.

In an embodiment, when receiving the one image data among the first image data and the second image data, the network-on-chip filters redundant data in the one image data and encodes the filtered data into the first data.

In an embodiment, when the external server processes image data based on a red-green-blue (RGB) format, the network-on-chip assigns a weight to a predetermined single color depending on a first criterion and encodes the one image data among the first image data and the second image data into the first data.

In an embodiment, when the external server processes image data based on a YUV format, the network-on-chip assigns a weight to a predetermined color depending on a second criterion and encodes the one image data of the first image data and the second image data into the first data.

In an embodiment, when receiving the non-image data, the network-on-chip ignores data in a predetermined range and encodes the non-image data into the second data.

In an embodiment, when receiving the non-image data, the network-on-chip converts the non-image data to an ASCII code and encodes the converted ASCII code of the non-image data into a variable-length code.

In an embodiment, after storing the first data and the second data in a memory, the network-on-chip outputs the first data and the second data to transmit the first data and the second data to the external server.

In an embodiment, the first data converter divides the first data by a predetermined burst length so as to be output. The second data converter divides the second data by a predetermined burst length so as to be output.

According to an embodiment of the present disclosure, a data processing method of a sensor device including a network-on-chip comprises receiving first image data and second image data from at least one image sensor and encoding one image data among the first image data and the second image data, into first data, based on whether the first image data is identical to the second image data, receiving non-image data from at least one non-image sensor and encoding the received non-image data into second data, and transmitting the first data and the second data to an external server at a burst length.

In an embodiment, the method further comprises filtering redundant data in the one image data among the first image data and the second image data when receiving the one image data among the first image data and the second image data.

In an embodiment, wherein when the external server processes image data based on an RGB format, the network-on-chip assigns a weight to a predetermined single color depending on a first criterion and encodes the one image data among the first image data and the second image data into the first data.

In an embodiment, wherein when the external server processes image data based on a YUV format, the network-on-chip assigns a weight to a predetermined color depending on a second criterion and encodes the one image data of the first image data and the second image data into the first data.

In an embodiment, wherein when receiving the non-image data, the network-on-chip ignores data in a predetermined range and encodes the non-image data into the second data.

In an embodiment, wherein when receiving the non-image data, the network-on-chip converts the non-image data to an ASCII code and encodes the converted ASCII code of the non-image data into a variable-length code.

In an embodiment, the method further comprises storing the first data and the second data in a memory.

In an embodiment, the method further comprises dividing the first data and the second data by a predetermined burst length so as to be transmitted to the external server.

According to an embodiment of the present disclosure, a sensor device includes a processor including a network-on-chip including a first data converter and a second data converter. The first data converter receives first image data and second image data from at least one image sensor and encodes one image data among the first image data and the second image data, into first data, based on whether the first image data is identical to the second image data. A second data converter receives non-image data from at least one non-image sensor and encodes the received non-image data into second data. The processor stores the first data and the second data in a memory and outputs the first data and the second data to transmit the first data and the second data to an external server at a burst length.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
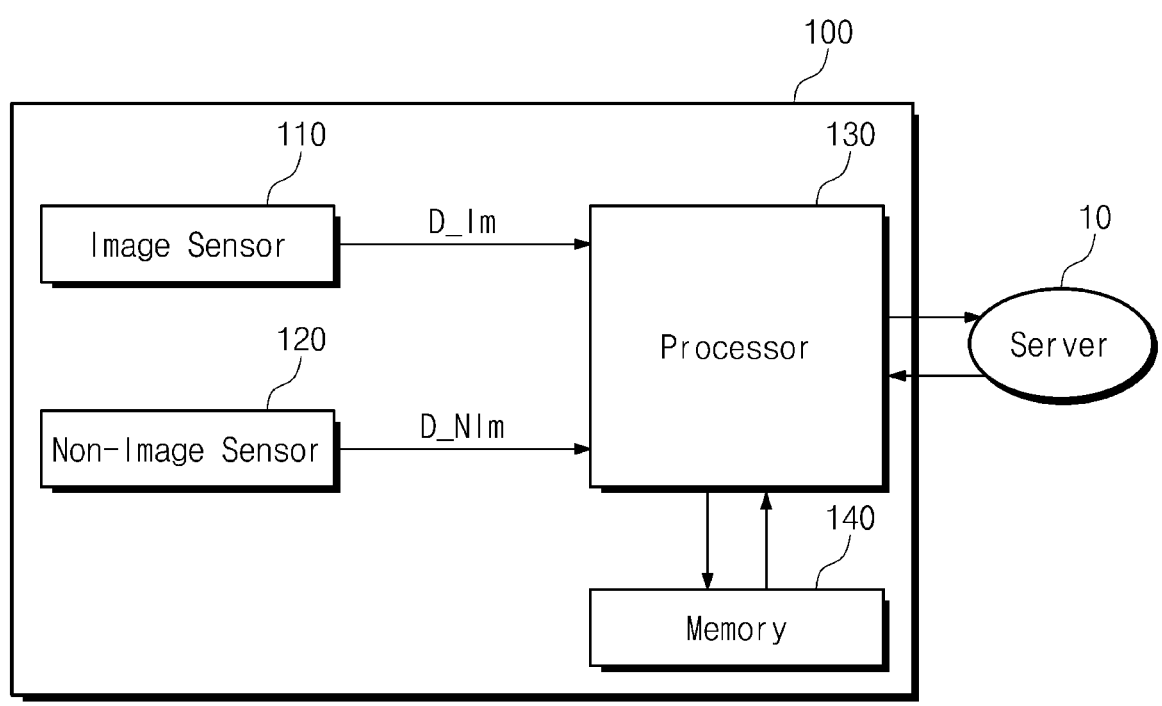
FIG. 1 is a block diagram of a sensor device, according to an embodiment of the present disclosure.

The same reference numerals denote the same elements throughout the specification. This specification does not describe all elements of embodiments. Well-known content or redundant content in which embodiments are the same as one another will be omitted in a technical field to which the present disclosure belongs. A term such as 'unit, module, member, or block' used in the specification may be implemented with software or hardware. According to embodiments, a plurality of 'units, modules, members, or blocks' may be implemented with one component, or a single 'unit, module, member, or block' may include a plurality of components.

Throughout this specification, when it is supposed that a portion is "connected" to another portion, this includes not only a direct connection, but also an indirect connection. The indirect connection includes being connected through a wireless communication network.

Furthermore, when a portion "comprises" a component, it will be understood that it may further include another component, without excluding other components unless specifically stated otherwise.

Terms such as 'first', 'second', and the like are used to distinguish one component from another component, and thus the component is not limited by the terms described above.

Unless there are obvious exceptions in the context, a singular form includes a plural form.

In each step, an identification code is used for convenience of description. The identification code does not describe the order of each step. Unless the context clearly states a specific order, each step may be performed differently from the specified order.

Hereinafter, operating principles and embodiments of the present disclosure will be described with reference to the accompanying drawings.

FIG. 1 is a block diagram of a sensor device 100, according to an embodiment of the present disclosure.

Referring to FIG. 1, the present disclosure may include an image sensor 110 and a non-image sensor 120. In addition, the present disclosure may further include a processor 130 that receives data from the image sensor 110 and the non-image sensor 120 and processes the data. Furthermore, the present disclosure may include a memory 140 that stores encoded data.

According to an embodiment of the present disclosure, the image sensor 110 may detect an external object, may generate image data D_Im corresponding to the object, and may transmit the image data D_Im to the processor 130. Herein, the image sensor 110 may include a photoelectric conversion element, and may include a line image sensor (one-dimensional image sensor) and an array image sensor (two-dimensional image sensor).

According to an embodiment of the present disclosure, the non-image sensor 120 refers to a sensor that detects elements other than objects. In detail, the non-image sensor 120 may detect elements other than external objects and may transmit the detection result to the processor 130. Herein, the elements other than external objects may include the concentration of a specific substance, air quality, temperature, or the like, but are not limited thereto. For example, the elements may include all those that are not converted to image data.

According to an embodiment of the present disclosure, the processor 130 may receive at least one of the image data D_Im or the non-image data D_NIm from the image sensor 110 or the non-image sensor 120 and then may encode the image data D_Im or the non-image data D_NIm. When the processor 130 receives the image data D_Im, the image data D_Im may be encoded into first data by the processor 130. Moreover, when the processor 130 receives the non-image data D_NIm, the non-image data D_NIm may be encoded into second data by the processor 130. The non-image data may be expressed as numerical data, but is not limited thereto. Hereinafter, 'encoding or coding' used in the present specification may include encoding.

Furthermore, the processor 130 may transmit, to an external server, the first data and the second data at a predetermined burst length. Herein, the processor 130 may use an encoding method changed depending on a data type. A data encoding method according to the data type will be described in detail with reference to FIGS. 3 and 4. Moreover, the processor 130 may store the first data and the second data in the memory 140 and may transmit the first data and the second data to an external server. Herein, the external server may be a cloud server, but is not limited thereto.

The memory 140 according to an embodiment of the present disclosure may store the first data and the second data. In particular, the memory 140 may be a first-in first-out (FIFO) memory, but is not limited thereto.

Figure 2:
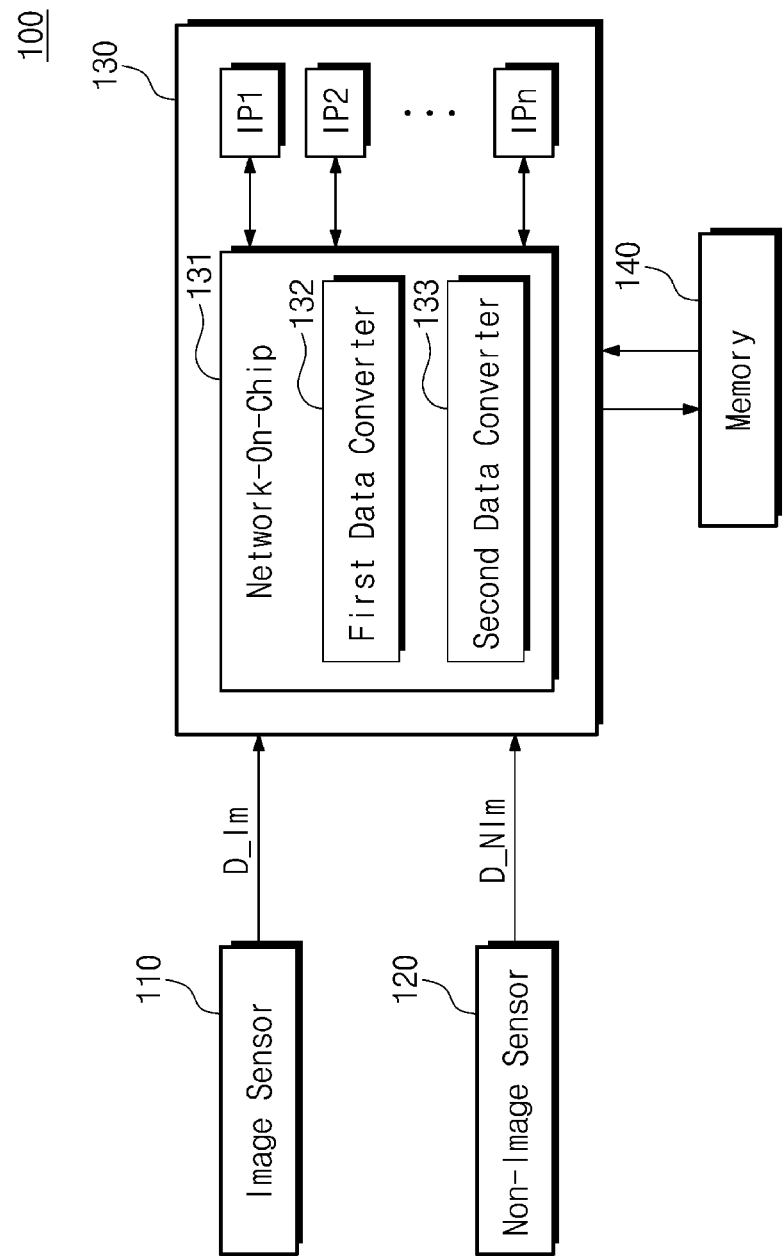
FIG. 2 is a block diagram illustrating a processor of a sensor device, according to an embodiment of the present disclosure.

FIG. 2 is a block diagram illustrating the processor 130 of the sensor device 100 of FIG. 1.

According to an embodiment of the present disclosure, the processor 130 may include a network-on-chip 131. The network-on-chip 131 may include a first data converter (image protocol converter (IPC)) 132 and a second data converter (non-image protocol converter (NIPC)) 133. The network-on-chip 131 may be connected to a plurality of hardware intellectual properties (IP1, IP2, IPn) included in the processor 130.

According to an embodiment of the present disclosure, the first data converter 132 may receive the image data D_Im from the image sensor 110 and may encode the image data D_Im into first data. Furthermore, the second data converter 133 may receive the non-image data D_NIm from the non-image sensor 120 and may encode the non-image data D_NIm into second data. Herein, a process of encoding data may be determined depending on a data processing format of an external server. A detailed data processing method will be described with reference to FIGS. 3 and 4.

Figure 3:
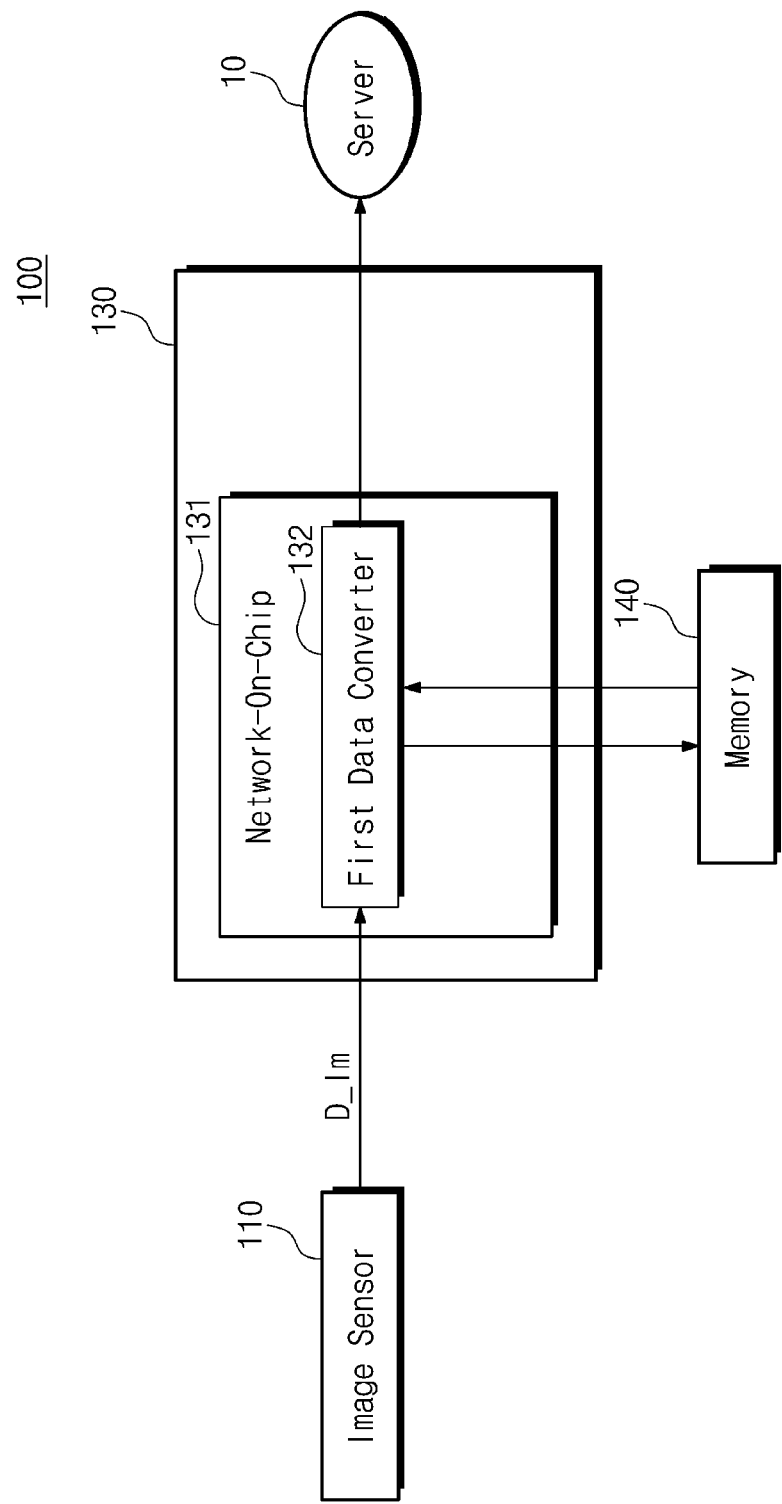
FIG. 3 illustrates a data processing process when a processor of a sensor device receives image data, according to an embodiment of the present disclosure.

FIG. 3 illustrates a data processing process when the processor 130 of the sensor device 100 receives the image data D_Im, according to an embodiment of the present disclosure.

The image sensor 110 may detect an external object and may deliver the detection result to the first data converter (IPC) 132 of the processor 130. Herein, the first data converter 132 may encode the image data D_Im into the first data.

Also, the first data converter 132 may ignore redundant data without receiving the redundant data. In detail, the input image data D_Im may include images of objects that overlap one another or images of objects, which are detected by another sensor adjacent to the image sensor 110 and which overlap one another. When there are pieces of image data of objects, which overlap one another, from among the input image data D_Im, the first data converter 132 may filter the pieces of image data of objects, which overlap one another. In this case, color elements included in the objects may be used to determine whether there are images of objects, which overlap one another.

In particular, when an image data processing format used by an external server 10 is a red-green-blue (RGB) format, the first data converter 132 may assign a weight to a predetermined single color and then may encode the image data D_Im into the first data. Herein, the predetermined single color refers to red, green, and blue. Also, the degree of the weight may be determined depending on the content of data. For example, when there are many red components in the input image data D_Im, the first data converter 132 may assign a high weight to red and may encode the image data D_Im into the first data. Also, the first data converter 132 may ignore data corresponding to a color other than a predetermined single color; alternatively, the first data converter 132 may assign a low weight to the data and then may encode the data.

Moreover, when the image data processing format used by the external server 10 is a YUV format, the first data converter 132 may assign a weight to a predetermined color and then may encode the input image data D_Im into the first data. Herein, the YUV format is used by a method of processing image data that constitute colors having information about brightness (Y), a blue color difference (U), and a red color difference (V). When the image data processing format used by the external server 10 is a YUV format, the first data converter 132 may assign a weight to a black/white (Y), a blue color difference (U), and a red color difference (V) in predetermined colors and then may encode the image data D_Im into the first data. Also, similarly to a case where the image data processing format used by the external server 10 is the RGB format, the weight used when the first data converter 132 converts data may be determined depending on the content of data. For example, when there are many black/white (brightness) components in the input image data D_Im, the first data converter 132 may assign a high weight to the brightness of an image and then may encode the image data D_Im into the first data.

When the first data converter 132 encodes the image data D_Im into the first data, the first data converter 132 may encode data by assigning the data of a color having a low weight to an intermediate value or saturating the data of the color to a specific value. For example, when the input first data is data corresponding to 8-bit color, the first data converter 132 may allocate a value of 128 to the data of a color having a low weight.

However, an encoding method of the first data converter 132 according to the type of the data processing format used by the external server 10 is only an example. A weight used for data encoding of the first data converter 132 may vary depending on the content of input data.

The first data converter 132 may transmit the first data to the server 10 at a burst length, for storing the first data in the memory 140 after the first data converter 132 encodes the image data D_Im into the first data. Herein, the burst length is determined by a communication protocol with the external server 10. For example, when data is transmitted to the external server 10 in units of 8 bits, the burst length may be a length corresponding to 8 bits. However, a unit in which the external server 10 stores data is not limited thereto. As described above, the sensor device 100 according to an embodiment of the present disclosure may store the first data in the memory 140 and may transmit the first data to the server 10, thereby minimizing the traffic of a network-on-chip and efficiently processing data at low power.

Figure 4:
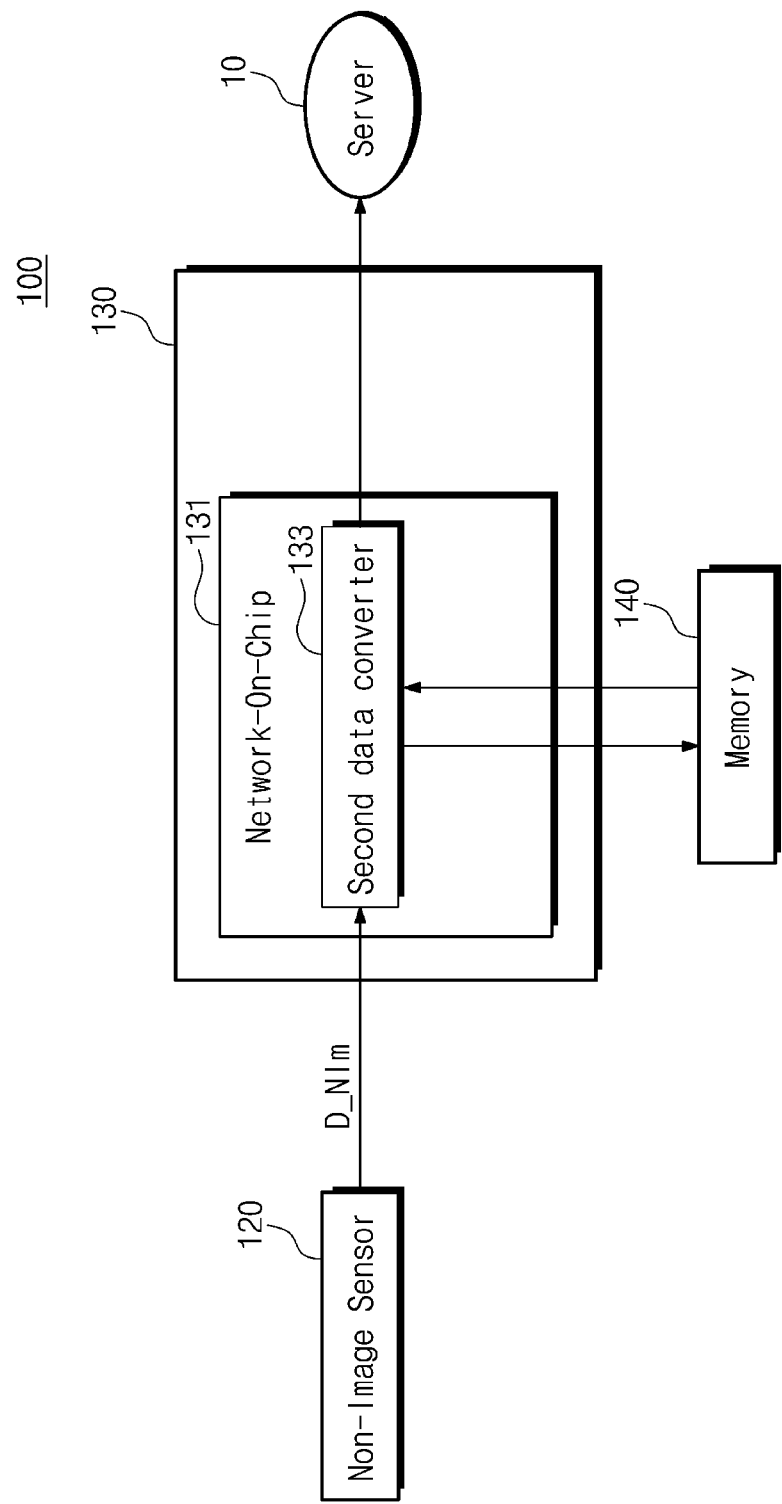
FIG. 4 illustrates a data processing process when a processor of a sensor device receives non-image data, according to an embodiment of the present disclosure.

FIG. 4 illustrates a data processing process when the processor 130 of the sensor device 100 receives the non-image data D_NIm, according to an embodiment of the present disclosure.

Referring to FIG. 4, the non-image sensor 120 may detect a non-image element and may transmit the detection result to the second data converter NIPC 133. The second data converter 133 may receive the detection result of the non-image sensor 120 and may encode the non-image data D_NIm received from the non-image sensor 120 into the second data. Herein, the non-image data D_NIm may be expressed as a character, a code, or a number. However, an embodiment of the numerical data will be described later.

When the non-image data D_NIm is numerical data, the second data converter 133 may ignore data in a predetermined range and may encode the non-image data D_NIm into the second data. In detail, numerical data in a specific range in the non-image data D_NIm may occupy most of the non-image data D_NIm. Actually, numerical data in a range required for analysis in the actual server 10 may not occur all the time. Accordingly, the second data converter 133 may ignore data having a numerical range other than a numerical range of data, which is required by the external server 10, in the input non-image data D_NIm.

Besides, the second data converter 133 may encode the received non-image data D_NIm into the second data. Herein, an operation of encoding the non-image data D_NIm includes encoding the inputted non-image data D_NIm into ASCII code and encoding the encoded ASCII code into a variable-length code. Moreover, the second data converter 133 may periodically update a lookup table of a variable code length, which is used to compress the non-image data D_NIm. Through the above-described operation of encoding the non-image data D_NIm, the sensor device 100 according to an embodiment of the present disclosure may reduce the amount of data transmitted to the server 10 and may be efficiently driven at low power.

Figure 5:
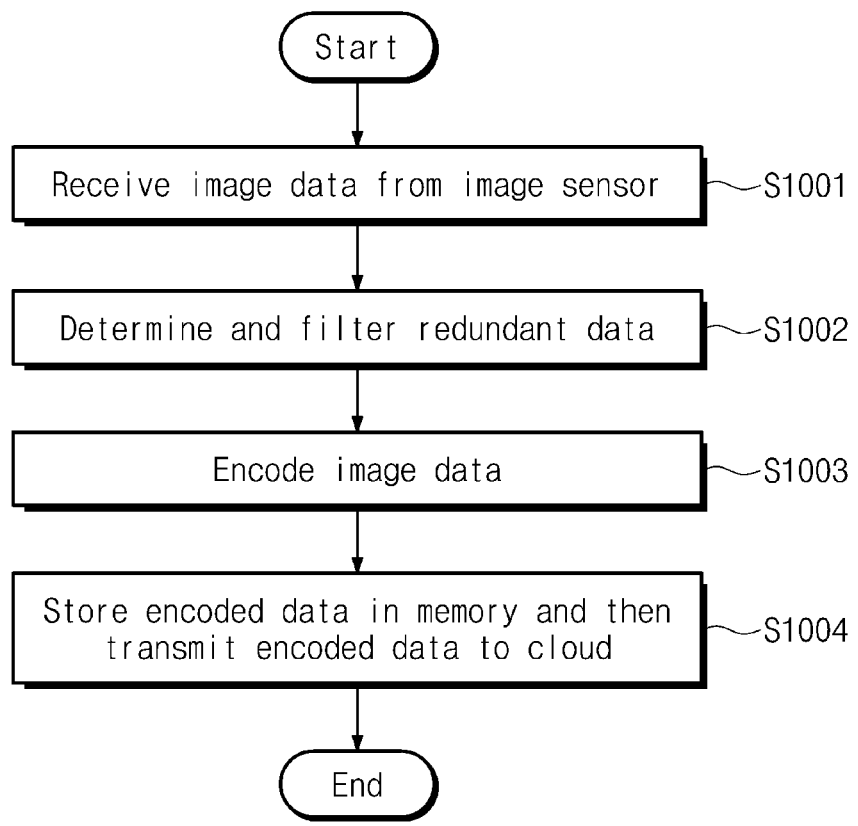
FIG. 5 is a flowchart illustrating a data processing process when a processor of a sensor device receives image data, according to an embodiment of the present disclosure.

FIG. 5 is a flowchart illustrating a data processing process when the processor 130 of the sensor device 100 receives the image data D_Im, according to an embodiment of the present disclosure. Referring to FIG. 5, the processor 130 may receive the image data D_Im (see FIG. 1) from the image sensor 110 (S1001).

The first data converter 132 may receive the image data D_Im from the image sensor 110 (see FIG. 1). The first data converter 132 may perform filtering such that the same image data received from the image sensor 110 or another image sensor (not shown) is not stored (S1002).

When receiving the image data D_Im, the first data converter 132 may encode the received image data D_Im (S1003). As described above, an encoding method may be determined depending on an image data processing format used by the external server 10. In particular, when an image data processing format used by the external server 10 is a red-green-blue (RGB) format, the first data converter 132 may assign a weight to a predetermined single color and then may encode the input image data D_Im into the first data. Furthermore, when the image data processing format used by the external server 10 is a YUV format, the first data converter 132 may assign a weight to a black/white (Y), a blue color difference (U), and a red color difference (V), which are a predetermined color, and then may encode the input image data D_Im into the first data.

In detail, the first data converter 132 may encode final data based on the above-described weight. As described above, in an embodiment in which the data processing format of the external server 10 is the RGB format, when there are a lot of red components in the image data D_Im, the first data converter 132 may assign a high weight to red and then may encode the image data D_Im into the first data. Also, the first data converter 132 may ignore data corresponding to a color other than a predetermined single color; alternatively, the first data converter 132 may assign a low weight to the data and then may encode the data.

After the image data D_Im is encoded into the first data, the processor 130 may store the first data in the memory 140 and then may transmit the first data to the server 10 (S1004). Herein, the server 10 may include a cloud server, but is not limited thereto.

Figure 6:
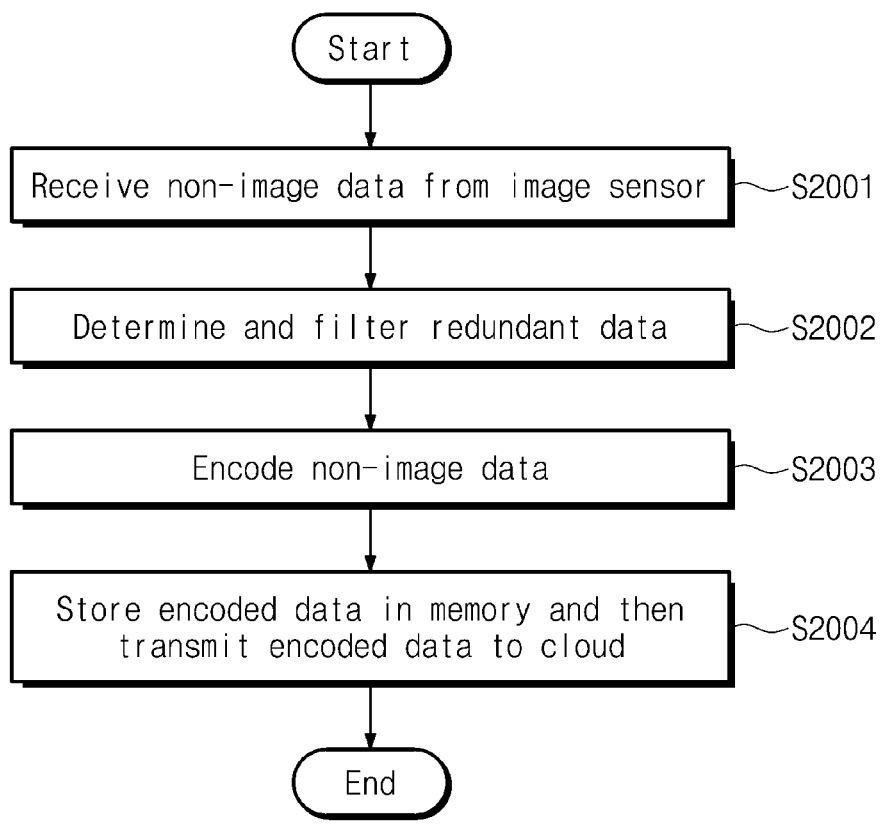
FIG. 6 is a flowchart illustrating a data processing process when a processor of a sensor device receives non-image data, according to an embodiment of the present disclosure.

FIG. 6 is a flowchart illustrating a data processing process when the processor 130 of the sensor device 100 receives the non-image data D_NIm, according to an embodiment of the present disclosure.

Referring to FIG. 6, when the non-image sensor 120 detects a non-image element, the second data converter 133 may receive the non-image data D_NIm (S2001).

When receiving the non-image data D_NIm, the second data converter 133 may determine and filter redundant data (S2002). In particular, when the non-image data D_NIm is expressed as numerical data, the second data converter 133 may not redundantly receive data, which has a specific numerical range and which is repeated.

When the non-image data D_NIm is completely entered, the second data converter 133 may encode the non-image data D_NIm into the second data (S2003). In detail, as described above, the second data converter 133 may ignore data having a numerical value in a specific range; and, the second data converter 133 may assign a weight to data necessary for analysis in the external server 10 and then may encode the non-image data D_NIm into the second data.

After the non-image data D_NIm is encoded into the second data, the processor 130 may store the second data in the memory 140 and then may transmit the second data to the server 10 (S2004). Herein, the server 10 may include a cloud server, but is not limited thereto.

Figure 7:
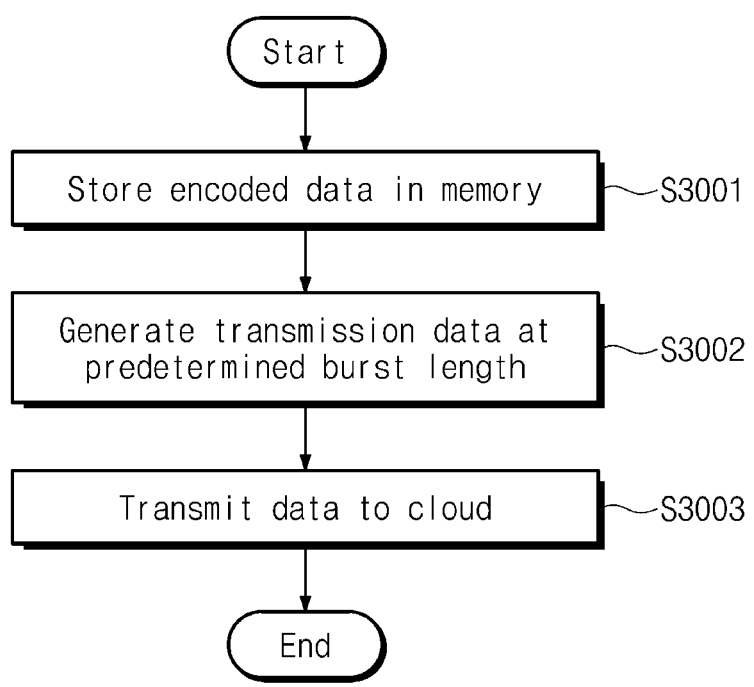
FIG. 7 is a flowchart illustrating a process, in which a processor of a sensor device transmits data to an external server, according to an embodiment of the present disclosure.

FIG. 7 is a flowchart illustrating a process, in which the processor 130 of the sensor device 100 transmits data to the external server 10, according to an embodiment of the present disclosure.

Referring to FIG. 7, the processor 130 may store encoded data (e.g., the above-described first data or the above-described second data) in the memory 140 (S3001). In detail, the processor 130 may store the encoded data in the memory 140 before transmitting the encoded data to the server 10 and then may transmit the encoded data to the server 10, thereby efficiently managing data.

When the encoded data is stored in the memory 140, the processor 130 may generate transmission data at a predetermined burst length (S3002). Herein, the predetermined burst length may be determined by a communication protocol with the external server 10. For example, when the external server 10 uses a communication method in units of 8 bits, the burst length may correspond to 8 bits. However, a unit in which the external server 10 stores data is not limited thereto.

When the transmission data is generated at a predetermined burst length, the processor 130 transmits the generated transmission data to the server 10 (S3003). Herein, the server 10 may be a cloud server, but is not limited thereto.

The above-mentioned description refers to embodiments for implementing the scope of the present disclosure. Embodiments in which a design is changed simply or which are easily changed may be included in the scope of the present disclosure as well as an embodiment described above. In addition, technologies that are easily changed and implemented by using the above-mentioned embodiments may be also included in the scope of the present disclosure.

By including the above-described configuration, the present disclosure may generate non-image/image data suitable for an edge device by removing redundancy of data, which is collected by various edge sensors (IoT sensors) and then by encoding the data.

In addition, the present disclosure may provide a sensor device, which is smoothly driven even at low power, by encoding pieces of data.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A network-on-chip comprising:
    a first data converter configured to receive first image data and second image data from at least one image sensor; and
    a second data converter configured to receive non-image data from at least one non-image sensor,
    wherein the first data converter is configured to encode one image data among the first image data and the second image data, into first data, based on whether the first image data is identical to the second image data,
    wherein the second data converter is configured to perform filtering of the received non-image data and to encode the filtered non-image data into second data,
    wherein the network-on-chip outputs the first data and the second data to transmit the first data and the second data to an external server at a burst length,
    wherein the image sensor is configured to detect an external object, wherein the non-image sensor is configured to detect elements other than the external object,
wherein the elements other than the object includes a concentration of a specific substance, air quality or temperature,
wherein the first data converter further performs a process of encoding on the first data,
wherein the process of encoding on the first data may be determined depending on a data processing format of the external server,
wherein, the process of encoding the first data includes:
assigning a first weight to a predetermined single color;
assigning a second weight to a color other than the predetermined single color; and
encoding the first data by assigning the first data of the color having the second weight to an intermediate value or by saturating the first data of the color having the second weight to a specific value,
wherein the filtering of the received non-image data includes:
determining, in response to the received non-image data being expressed as numeric, whether the received non-image data is within a first range;
determining, in response to the determination that the received no-image data is not within the first range, whether the received non-image data is within a second range; and
determining, in response to the determination the received non-image data is within the second range, the received data as filtered data,
wherein the first range is determined based on repeated receipt of numeric value,
wherein the second range is determined based on request of the external server, and
wherein the encoding the filtered non-image data includes:
converting, in response to the filtered non-image data being expressed as text or code, the filtered data to an ASCII code; and
encodes the converted ASCII code of the non-image data into a variable-length code.

2. The network-on-chip of claim 1, wherein, when receiving the one image data among the first image data and the second image data, the first data converter is configured to:
filter redundant data in the one image data; and
encode the filtered data into the first data.

3. The network-on-chip of claim 1, wherein, when the external server processes image data based on a red-green-blue (RGB) format, the first data converter is configured to:
assign a weight to a predetermined single color depending on a first criterion; and
encode the one image data among the first image data and the second image data into the first data.

4. The network-on-chip of claim 1, wherein, when the external server processes image data based on a YUV format, the first data converter is configured to:
assign a weight to a predetermined color depending on a second criterion; and
encode the one image data of the first image data and the second image data into the first data.

5. The network-on-chip of claim 1, wherein the first data converter divides the first data by a predetermined burst length so as to be output, and
wherein the second data converter divides the second data by a predetermined burst length so as to be output.

6. A data processing method of a sensor device including a network-on-chip, the method comprising:

receiving first image data and second image data from at least one image sensor;
encoding one image data among the first image data and the second image data, into first data, based on whether the first image data is identical to the second image data;
receiving non-image data from at least one non-image sensor;
perform filtering of the received non-image data;
encoding the filtered non-image data into second data; and
transmitting the first data and the second data to an external server at a burst length,
wherein the image sensor is configured to detect an external object,
wherein the non-image sensor is configured to detect elements other than the external object,
wherein the elements other than the object may include a concentration of a specific substance, air quality or temperature,
wherein the method further comprises performing a process of encoding on the first data,
wherein the process of encoding on the first data may be determined depending on a data processing format of the external server,
wherein, the process of encoding the first data includes:
assigning a first weight to a predetermined single color;
assigning a second weight to a color other than the predetermined single color; and
encoding the first data by assigning the first data of the color having the second weight to an intermediate value or by saturating the first data of the color having the second weight to a specific value
wherein performing the filtering of the received non-image data includes:
determining, in response to the received non-image data being expressed as numeric, whether the received non-image data is within a first range;
determining, in response to the determination that the received no-image data is not within the first range, whether the received non-image data is within a second range; and
determining, in response to the determination the received non-image data is within the second range, the received data as filtered data,
wherein the first range is determined based on repeated receipt of numeric value,
wherein the second range is determined based on request of the external server, and
wherein the encoding the filtered non-image data includes:
converting, in response to the filtered non-image data being expressed as text or code, the filtered data to an ASCII code; and
encodes the converted ASCII code of the non-image data into a variable-length code.

7. The method of claim 6, further comprising:
when receiving the one image data among the first image data and the second image data, filtering redundant data in the one image data among the first image data and the second image data.

8. The method of claim 6, wherein, when the external server processes image data based on an RGB format, the network-on-chip is configured to:
assign a weight to a predetermined single color depending on a first criterion; and
encode the one image data among the first image data and the second image data into the first data.

9. The method of claim 6, wherein, when the external server processes image data based on a YUV format, the network-on-chip is configured to:
- assign a weight to a predetermined color depending on a second criterion; and
- encode the one image data of the first image data and the second image data into the first data.

10. The method of claim 6, further comprising:
storing the first data and the second data in a memory.

11. The method of claim 10, further comprising:
dividing the first data and the second data by a predetermined burst length so as to be transmitted to the external server.

12. A sensor device comprising:
a processor including a network-on-chip including a first data converter and a second data converter,
wherein the first data converter is configured to:
- receive first image data and second image data from at least one image sensor; and
- encode one image data among the first image data and the second image data, into first data, based on whether the first image data is identical to the second image data, wherein a second data converter is configured to:
- receive non-image data from at least one non-image sensor;
- perform filtering of the received non-image data; and
- encode the filtered non-image data into second data, wherein the processor is configured to:
- store the first data and the second data in a memory; and
- output the first data and the second data to transmit the first data and the second data to an external server at a burst length, wherein the image sensor is configured to detect an external object,
wherein the non-image sensor is configured to detect elements other than the external object,
wherein the elements other than the object may include a concentration of a specific substance, air quality or temperature,
wherein the network-on-chip further performs a process of encoding on the first data,
wherein the process of encoding on the first data may be determined depending on a data processing format of the external server,
wherein, the process of encoding the first data includes:
- assigning a first weight to a predetermined single color;
- assigning a second weight to a color other than the predetermined single color; and
- encoding the first data by assigning the first data of the color having the second weight to an intermediate value or by saturating the first data of the color having the second weight to a specific value, wherein performing the filtering of the received non-image data includes:
- determining, in response to the received non-image data being expressed as numeric, whether the received non-image data is within a first range;
- determining, in response to the determination that the received no-image data is not within the first range, whether the received non-image data is within a second range; and
- determining, in response to the determination the received non-image data is within the second range, the received data as filtered data, wherein the first range is determined based on repeated receipt of numeric value,
wherein the second range is determined based on request of the external server, and
wherein the encoding the filtered non-image data includes:
- converting, in response to the filtered non-image data being expressed as text or code, the filtered data to an ASCII code; and
- encodes the converted ASCII code of the non-image data into a variable-length code.

* * * * *